United States Patent
Li (10) Patent No.: US 11,991,712 B2
(45) Date of Patent: May 21, 2024

(54) METHOD AND APPARATUS FOR DCI RECEIVING AND TRANSMITTING, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 565 days.

(21) Appl. No.: 17/287,103

(22) PCT Filed: Oct. 25, 2018

(86) PCT No.: PCT/CN2018/111980
§ 371 (c)(1),
(2) Date: Apr. 20, 2021

(87) PCT Pub. No.: WO2020/082313
PCT Pub. Date: Apr. 30, 2020

(65) Prior Publication Data
US 2021/0377998 A1 Dec. 2, 2021

(51) Int. Cl.
*H04W 72/23* (2023.01)
*H04W 72/50* (2023.01)

(52) U.S. Cl.
CPC ......... *H04W 72/23* (2023.01); *H04W 72/535* (2023.01)

(58) Field of Classification Search
None
See application file for complete search history.

(56) References Cited

U.S. PATENT DOCUMENTS

| | | | |
|---|---|---|---|
| 2018/0279274 A1 | 9/2018 | Sun et al. | |
| 2019/0141742 A1* | 5/2019 | Zhou | H04L 5/0064 |
| 2019/0357300 A1* | 11/2019 | Zhou | H04W 72/0453 |
| 2020/0382264 A1* | 12/2020 | Aiba | H04L 5/0094 |
| 2021/0119759 A1* | 4/2021 | Xue | H04W 72/0453 |

(Continued)

FOREIGN PATENT DOCUMENTS

| | | |
|---|---|---|
| CN | 105207754 A | 12/2015 |
| CN | 107396173 A | 11/2017 |

(Continued)

OTHER PUBLICATIONS

Interdigital Inc: "BWP operation in unlicensed spectrum",3GPP Draft; R1-1806968, [retrieved on May 11, 2018].

(Continued)

*Primary Examiner* — Jenkey Van
(74) *Attorney, Agent, or Firm* — Syncoda LLC; Feng Ma (57) ABSTRACT

A method for DCI receiving and transmitting includes: a terminal monitoring, on n activated BWPs configured by a base station, DCI transmitted by the base station, wherein n is an integer greater than one; after the terminal finds, on a first activated BWP in the n activated BWPs, the first DCI transmitted by the base station, the terminal determining a second activated BWP required to continue monitoring from the n activated BWPs; and the terminal continuing to monitor, on the second activated BWP, the DCI transmitted by the base station, and stopping monitoring, on activated BWPs other than the second activated BWP, the DCI transmitted by the base station.

18 Claims, 6 Drawing Sheets

(56) References Cited

U.S. PATENT DOCUMENTS

2021/0367743 A1* 11/2021 Kim ............... H04L 5/0098
2021/0409170 A1* 12/2021 Cirik ............. H04W 74/0808

FOREIGN PATENT DOCUMENTS

| WO | 2011082534 A1 | 7/2011 |
| WO | 2013085335 A1 | 6/2013 |
| WO | 2016167623 A1 | 10/2016 |
| WO | 2018137601 A1 | 8/2018 |

OTHER PUBLICATIONS

Vivo: "Discussion on the channel access procedures",3GPP Draft; R1-1810382, [retrieved on Sep. 29, 2018].

Supplementary European Search Report in the European application No. 18937732.8, mailed on May 20, 2022.

International Search Report of International Application No. PCT/CN2018/111980, mailed on Jul. 25, 2019.

Written Opinion of the International Search Authority of International Application No. PCT/CN2018/111980, mailed on Jul. 25, 2019.

First Office Action of Chinese Application No. 201880001781.2, issued on Apr. 25, 2021.

Media Tek Inc. "Further Details on Bandwidth Part Operation in NR", 3GPP TSG RAN WG1 Meeting #90 R1-17013978, Aug. 25, 2017 (Aug. 25, 2017), sections 1 and 2.

Interdigital Inc. "BWP operation in unlicensed spectrum", 3GPP RAN WG1 Meeting #92bis R1-1804680, Apr. 20, 2018 (Apr. 20, 2018), section 2.

3GPP TS 38.211 V16.6.0 (Jun. 2021), Technical Specification,3rd Generation Partnership Project;Technical Specification Group Radio Access Network;NR;Physical channels and modulation (Release 16).

Office Action of the Indian application No. 202147021911, issued on Jul. 27, 2022.

* cited by examiner

METHOD AND APPARATUS FOR DCI RECEIVING AND TRANSMITTING, AND STORAGE MEDIUM

CROSS-REFERENCE TO RELATED APPLICATION

This application is a U.S. national stage of International Application No. PCT/CN2018/111980 filed on Oct. 25, 2018, the disclosure of which is hereby incorporated by reference in its entirety.

TECHNICAL FIELD

The embodiments of the present disclosure relate to the field of communication technologies, and particularly to a method and an apparatus for receiving and sending Downlink Control Information (DCI) and a storage medium.

BACKGROUND

In a 5G New Radio (NR) system, the concept of Bandwidth Part (BWP) is introduced. That is to say, for a terminal, a frequency band is divided into several BWPs, and the terminal is configured with multiple BWPs in a period of time, but there is only one activated BWP at a time, and the terminal only monitors DCI signaling on the activated BWP.

After obtaining the activated BWP configured by a base station for the terminal, the terminal can monitor DCI sent by the base station on the activated BWP. Then, the terminal can receive downlink data sent by the base station on a Physical Downlink Shared Channel (PDSCH) according to the received DCI, or send uplink data to the base station through a Physical Uplink Shared Channel (PUSCH) according to the received DCI.

In addition, relevant standards organizations have further proposed NR unlicensed technology, which is used for communication using NR technology on unlicensed spectrum. Before using the unlicensed spectrum, channel detection must be performed through an Listen Before Talk (LBT) mechanism. If the result of the detection is that the channel is in an idle state, the unlicensed spectrum can be accessed.

After the base station configures an activated BWP for the terminal, if the base station detects that the channel is in a busy state on the activated BWP, the base station cannot send DCI to the terminal through the activated BWP, resulting in the inability to effectively schedule and control the terminal, such as the inability to schedule the terminal for performing uplink and downlink data transmission.

SUMMARY

The embodiments of the present disclosure provide a method and an apparatus for receiving and sending DCI and a storage medium. The technical solution is as follows.

According to a first aspect of the embodiments of the present disclosure, there is provided a method for receiving DCI, including the following operations.

DCI sent by a base station is monitored by a terminal on n activated BWPs configured by the base station, where n is an integer greater than 1.

A second activated BWP that needs to be monitored continuously is determined by the terminal from the n activated BWPs after the terminal monitors first DCI sent by the base station on a first activated BWP among the n activated BWPs.

DCI sent by the base station is monitored by the terminal, on the second activated BWP continuously, and monitoring DCI sent by the base station is stopped on other activated BWPs other than the second activated BWP.

In an embodiment, determining, by the terminal, the second activated BWP that needs to be monitored subsequently from the n activated BWPs includes the following operation.

The first activated BWP is determined by the terminal as the second activated BWP that needs to be monitored continuously.

In an embodiment, the operation that the second activated BWP that needs to be monitored continuously is determined by the terminal from the n activated BWP includes the following operation.

The second activated BWP that needs to be monitored continuously is determined, by the terminal according to monitoring indication information in the first DCI, where the monitoring indication information includes an identifier of the second activated BWP.

In an embodiment, the method further includes the following operations.

An end time of a current channel occupation time period obtained by the base station through channel detection is determined by the terminal, where the current channel occupation time period is a channel occupation time period to which the first DCI belongs.

The operation of monitoring the DCI sent by the base station on the n activated BWPs configured by the base station is started by the terminal again when the end time of the current channel occupancy time arrives.

In an embodiment, the operation that the end time of the current channel occupation time period obtained by the base station through the channel detection is determined by the terminal includes one of following operations.

Second DCI sent by the base station is received by the terminal, where the second DCI indicates a duration of the current channel occupation time period, and the end time of the current channel occupation time period is determined by the terminal according to a start time of the current channel occupation time period and the duration of the current channel occupation time period.

Second DCI sent by the base station is received by the terminal, where the second DCI indicates an end time slot or an end symbol position within the current channel occupation time period, and the end time slot or the end symbol position is determined by the terminal as the end time of the current channel occupation time period.

Second DCI sent by the base station is received by the terminal, where the second DCI indicates uplink-downlink format information of time slots within the current channel occupation time period, and a time slot or a symbol corresponding to last uplink-downlink format information is determined by the terminal as the end time of the current channel occupation time period.

The second DCI includes at least one of the first DCI or the DCI sent by the base station on the second activated BWP.

In an embodiment, the method further includes the following operations.

At least one of BWP configuration information or BWP activation information is received by the terminal from the base station, where the at least one of BWP configuration information or BWP activation information is used to instruct the terminal to monitor the DCI sent by the base station on the n activated BWPs.

According to a second aspect of the embodiments of the present disclosure, there is provided a method for sending DCI, including the following operations.

One or more activated BWPs in a channel idle state is detected by a base station among n activated BWPs configured for a terminal, where n is an integer greater than 1.

A first activated BWP is selected by the base station from the one or more activated BWPs in the channel idle state.

First DCI is sent by the base station to the terminal through the first activated BWP.

In an embodiment, the first DCI carries monitoring indication information, where the monitoring indication information includes an identifier of a second activated BWP that needs to be monitored continuously by the terminal after the first DCI is received.

In an embodiment, the base station sends DCI to the terminal only through the second activated BWP before a current channel occupation time period ends, where the current channel occupation time period is a channel occupation time period to which the first DCI belongs.

In an embodiment, second DCI sent by the base station to the terminal indicates a duration of the current channel occupation time period, where the duration of the current channel occupation time period is used by the terminal to determine the end time of the current channel occupation time period according to a start time of the current channel occupation time period and the duration of the current channel occupation time period.

Alternatively, second DCI sent by the base station to the terminal indicates an end time slot or an end symbol position within the current channel occupation time period, where the end time slot or the end symbol position within the current channel occupation time period is determined by the terminal as the end time of the current channel occupation time period.

Alternatively, second DCI sent by the base station to the terminal indicates uplink-downlink format information of time slots within the current channel occupation time period, where a time slot or a symbol corresponding to last uplink-downlink format information is determined by the terminal as the end time of the current channel occupation time period.

The second DCI includes at least one of the first DCI or the DCI sent by the base station on the second activated BWP.

In an embodiment, the method further includes the following operations.

At least one of BWP configuration information or BWP activation information is sent by the base station to the terminal, where the at least one of BWP configuration information or BWP activation information is used to instruct the terminal to monitor the DCI sent by the base station on the n activated BWPs.

According to a third aspect of the embodiments of the present disclosure, there is provided an apparatus for receiving DCI, applied to a terminal, including a monitoring module and a BWP determining module.

The monitoring module is configured to monitor DCI sent by a base station on n activated BWPs configured by the base station, where n is an integer greater than 1.

The BWP determining module is configured to: after the monitoring module monitors first DCI sent by the base station on a first activated BWP among the n activated BWPs, determine a second activated BWP that needs to be monitored continuously from the n activated BWPs.

The monitoring module is further configured to monitor DCI sent by the base station on the second activated BWP continuously, and stop monitoring DCI sent by the base station on other activated BWPs other than the second activated BWP.

In an embodiment, the BWP determining module is configured to determine the first activated BWP as the second activated BWP that needs to be monitored continuously.

In an embodiment, the BWP determining module is configured to: according to monitoring indication information in the first DCI, determine the second activated BWP that needs to be monitored continuously, where the monitoring indication information includes an identifier of the second activated BWP.

In an embodiment, the apparatus further includes a time determining module.

The time determining module is configured to determine an end time of current channel occupation time period obtained by the base station through channel detection, where the current channel occupation time period is channel occupation time period to which the first DCI belongs.

The monitoring module is further configured to: when the end time of the current channel occupancy time arrives, start performing an operation of monitoring the DCI sent by the base station on the n activated BWPs configured by the base station again.

In an embodiment, the time determining module includes one of a first determining sub-module, a second determining sub-module and a third determining sub-module.

The first determining sub-module is configured to receive second DCI which is sent by the base station and indicates a duration of the current channel occupation time period, and determine the end time of the current channel occupation time period according to a start time of the current channel occupation time period and the duration of the current channel occupation time period.

The second determining sub-module is configured to receive second DCI which is sent by the base station and indicates an end time slot or an end symbol position within the current channel occupation time period, and determine the end time slot or the end symbol position as the end time of the current channel occupation time period.

The third determining sub-module is configured to receive second DCI which is sent by the base station and indicates uplink-downlink format information of time slots within the current channel occupation time period, and determine a time slot or a symbol corresponding to last uplink-downlink format information as the end time of the current channel occupation time period.

The second DCI includes at least one of the first DCI or the DCI sent by the base station on the second activated BWP.

In an embodiment, the apparatus further includes a receiving module.

The receiving module is configured to receive at least one of BWP configuration information or BWP activation information from the base station, where the at least one of BWP configuration information or BWP activation information is used to instruct the terminal to monitor the DCI sent by the base station on the n activated BWPs.

According to a fourth aspect of the embodiments of the present disclosure, there is provided an apparatus for sending DCI, applied to a base station. The apparatus includes a detecting module, a selecting module and a sending module.

The detecting module is configured to detect one or more activated BWPs in a channel idle state among n activated BWPs configured for a terminal, where n is an integer greater than 1.

The selecting module is configured to select a first activated BWP from the one or more activated BWPs in the channel idle state.

The sending module is configured to send first DCI to the terminal through the first activated BWP.

In an embodiment, the first DCI carries monitoring indication information, where the monitoring indication information includes an identifier of a second activated BWP that needs to be monitored continuously by the terminal after the first DCI is received.

In an embodiment, the base station sends DCI to the terminal only through the second activated BWP before current channel occupation time period ends, where the current channel occupation time period is a channel occupation time period to which the first DCI belongs.

In an embodiment, second DCI sent by the base station to the terminal indicates a duration of the current channel occupation time period, where the duration of the current channel occupation time period is used by the terminal to determine an end time of the current channel occupation time period according to a start time of the current channel occupation time period and the duration of the current channel occupation time period.

Alternatively, second DCI sent by the base station to the terminal indicates an end time slot or an end symbol position within the current channel occupation time period, where the end time slot or the end symbol position within the current channel occupation time period is determined by the terminal as an end time of the current channel occupation time period.

Alternatively, second DCI sent by the base station to the terminal indicates uplink-downlink format information of time slots within the current channel occupation time period, where a time slot or a symbol corresponding to last uplink-downlink format information is determined by the terminal as an end time of the current channel occupation time period.

The second DCI includes at least one of the first DCI or the DCI sent by the base station on the second activated BWP.

In an embodiment, the sending module is further configured to send at least one of BWP configuration information or BWP activation information to the terminal, where the at least one of BWP configuration information or BWP activation information is used to instruct the terminal to monitor the DCI sent by the base station on the n activated BWPs.

According to a fifth aspect of the embodiments of the present disclosure, there is provided a terminal. The terminal includes a processor, a memory, configured to store executable instructions of the processor. The processor is configured to perform the following operations:

monitoring DCI sent by a base station on n activated BWPs configured by the base station, where n is an integer greater than 1;

determining a second activated BWP that needs to be monitored continuously from the n activated BWPs, after the terminal monitors first DCI sent by the base station on a first activated BWP among the n activated BWPs; and monitoring DCI sent by the base station on the second activated BWP continuously, and stopping monitoring DCI sent by the base station on other activated BWPs except the second activated BWP.

According to a sixth aspect of the embodiments of the present disclosure, there is provided a base station. The base station includes: a processor; a memory, configured to store executable instructions of the processor. The processor is configured to perform the following operations:

detecting one or more activated BWPs in an channel idle state among n activated BWPs configured for a terminal, where n is an integer greater than 1;

selecting a first activated BWP from the one or more activated BWPs in the channel idle state; and sending first DCI to the terminal through the first activated BWP.

According to a seventh aspect of the embodiments of the present disclosure, there is provided a non-transitory computer-readable storage medium having stored thereon computer programs, where the computer programs implement operations of the method of the first aspect or operations of the method of the second aspect when the computer programs are executed by a processor.

The technical solutions provided by the embodiments of the present disclosure may include the following beneficial effects.

By configuring multiple activated BWPs for the terminal by the base station, the base station can select an activated BWP in the channel idle state from the multiple activated BWPs to send DCI to the terminal to ensure that the base station can effectively schedule and control the terminal. In addition, the terminal first monitors DCI on multiple activated BWPs configured by the base station. After the terminal monitors first DCI sent by the base station on a first activated BWP, the terminal determines a second activated BWP that needs to be monitored continuously from the multiple activated BWPs, and monitors DCI sent by the base station on the second activated BWP continuously, and stops monitoring DCI sent by the base station on other activated BWPs other than the second activated BWP, thereby avoiding the consumption of terminal power caused by the terminal monitoring DCI on the multiple activated BWP for a long time, which helps to save the terminal power.

It should be understood that the above general description and the following detailed description are only exemplary and explanatory, which cannot limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The network architecture and service scenarios described in the embodiments of the present disclosure are intended to more clearly illustrate the technical solutions of the embodiments of the present disclosure, and do not constitute a limitation to the technical solutions provided by the embodiments of the present disclosure. Those of ordinary skill in the art will know that with the evolution of the network architecture and the emergence of new service scenarios, the technical solutions provided by the embodiments of the present disclosure are equally applicable to similar technical problems.

Figure 1:
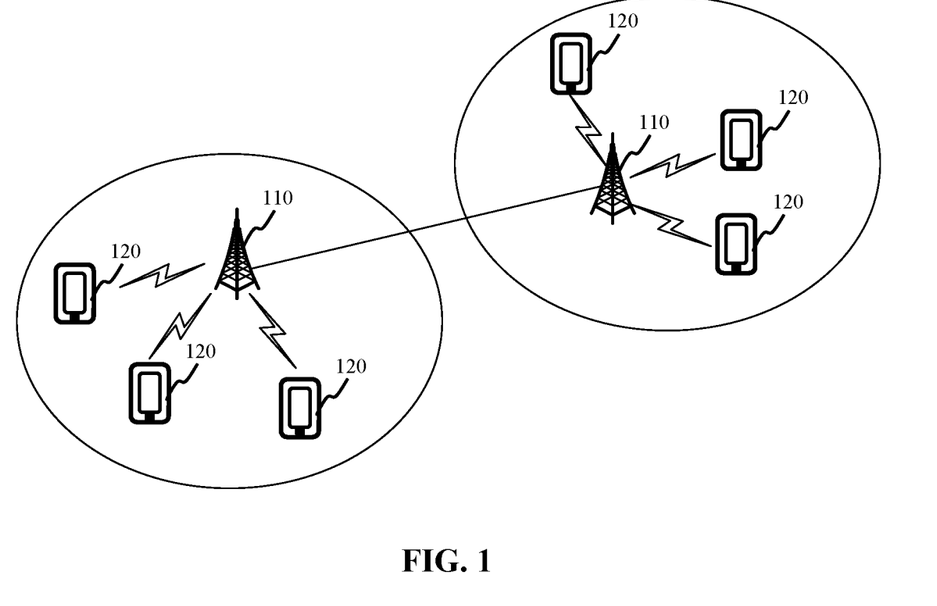
FIG. 1 is a schematic diagram showing a network architecture according to an exemplary embodiment.

FIG. 1 is a schematic diagram showing a network architecture according to an exemplary embodiment. The network architecture may include: a base station 110 and a terminal 120.

The base station 110 is deployed in an access network. The access network in the 5G NR system can be called New Generation-Radio Access Network (NG-RAN). The base station 110 and the terminal 120 communicate with each other through a certain air interface technology. For example, the base station 110 and the terminal 120 may communicate with each other through cellular technology.

The base station 110 is an apparatus deployed in an access network to provide the terminal 120 with a wireless communication function. The base station 110 may include various forms of macro base stations, micro base stations, relay stations, access points, and so on. In systems using different wireless access technologies, the name of apparatus with base station functions may be different. For example, in a 5G NR system, they are called gNodeB or gNB. As communication technology evolves, the name "base station" may change. For ease of description, in the embodiments of the present disclosure, the above-mentioned apparatus providing wireless communication functions for the terminal 120 are collectively referred to as the base station.

The number of terminals 120 is usually more than one, and one or more terminals 120 may be distributed in a cell managed by each base station 110. The terminal 120 may include various handheld devices, vehicle-mounted devices, wearable devices, computing devices or other processing devices with wireless communication functions that are connected to wireless modems, as well as various forms of user equipment (UE), mobile stations (MS), terminal devices and so on. For ease of description, in the embodiments of the present disclosure, the apparatus mentioned above are collectively referred to as terminals.

The "5G NR system" in the embodiments of the present disclosure may also be referred to as a 5G system or an NR system, but those skilled in the art can understand its meaning. The technical solutions described in the embodiments of the present disclosure may be applicable to the 5G NR system, and may also be applicable to the subsequent evolved system of the 5G NR system.

Figure 2:
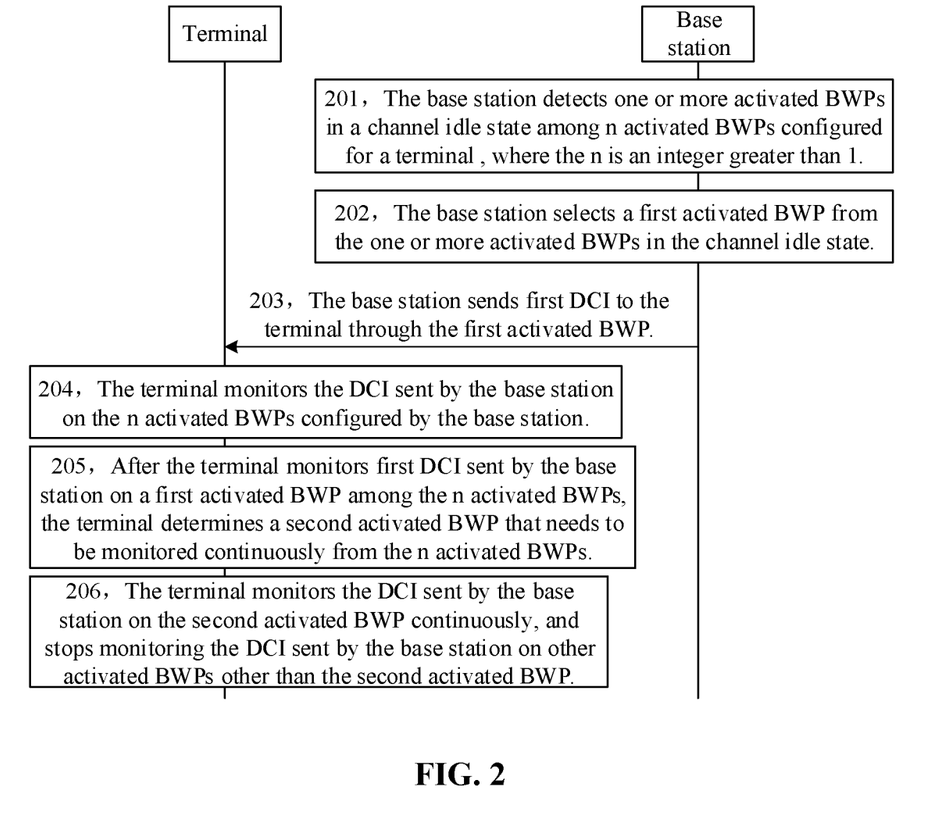
FIG. 2 is a flow chart showing a method for sending DCI according to an exemplary embodiment.

FIG. 2 is a flowchart showing a method for sending DCI according to an exemplary embodiment, and the method can be applied to the implementation environment shown in FIG. 1. The method can include the following operations.

In operation 201, the base station detects one or more activated BWPs in a channel idle state among n activated BWPs configured for a terminal, where the n is an integer greater than 1.

In the embodiment of the present disclosure, the base station can configure multiple activated BWPs for terminals in the serving cell of the base station, so as to avoid the situation that the terminal is only configured with one activated BWP and the DCI cannot be sent to the terminal when the activated BWP is in a busy channel state, which improves the success rate of DCI transmission.

The base station can configure activated BWPs for the terminal in the following manner: the base station sends at least one of BWP configuration information or BWP activation information to the terminal, and the at least one of BWP configuration information or BWP activation information is used to instruct the terminal to monitor DCI sent by the base station on n activated BWPs. In an embodiment, the BWP configuration information includes identifiers of the aforementioned n activated BWPs, the frequency domain resource locations of the BWPs, and the frequency domain location for sending DCI signaling for the BWP. The identifier of the BWP is used to uniquely indicate the BWP, and different BWPs have different identifiers. After receiving the at least one of BWP configuration information or BWP activation information from the base station, the terminal can determine the n activated BWPs configured by the base station according to the identifiers included in the at least one of BWP configuration information or BWP activation information.

When the base station has a need to send DCI to the terminal, the base station can perform channel detection on the above n activated BWPs, and determine activated BWPs in the channel idle state. In the embodiments of the present disclosure, there is no limitation on the manner in which the base station performs channel detection, and the relevant channel detection manner specified in the LBT mechanism may be used for channel detection.

In operation 202, the base station selects a first activated BWP from the one or more activated BWPs in the channel idle state.

The first activated BWP is an activated BWP in the channel idle state among the above n activated BWPs. In an embodiment, when the number of activated BWPs in the channel idle state among the above n activated BWPs is one, the base station determines this activated BWP as the first activated BWP; and when the number of activated BWPs in the channel idle state among the above n activated BWPs is more than one, the base station can select one activated BWP from the multiple activated BWPs as the first activated BWP. For example, the base station can randomly select one activated BWP from the multiple activated BWPs as the first activated BWP, or the base station selects an activated BWP with the lightest load as the first activated BWP according to the load conditions corresponding to the multiple activated BWPs, or for each terminal, the base station sets priority values for multiple activated BWPs, and the base station selects an activated BWP with the highest priority as the first activated BWP.

In operation 203, the base station sends first DCI to the terminal through the first activated BWP.

After selecting the first activated BWP, the base station sends the first DCI to the terminal through the first activated BWP. The first DCI can be used to perform resource scheduling on a PDSCH or a PUSCH for the terminal.

In addition, the base station sends the DCI to the terminal only through a second activated BWP before the current channel occupation time period ends, where the current channel occupation time period is the channel occupation time period to which the first DCI belongs. The base station can select the first activated BWP as the second activated BWP, or select another activated BWP from the above n activated BWPs other than the first activated BWP as the second activated BWP, such as selecting another activated BWP in the channel idle state as the second activated BWP. The manner in which the base station determines the second activated BWP may be specified by the protocol or determined by the base station.

In operation 204, the terminal monitors the DCI sent by the base station on the n activated BWPs configured by the base station.

After determining the n activated BWPs configured by the base station for the terminal, the terminal monitors the DCI sent by the base station on the n activated BWPs.

In operation 205, after the terminal monitors first DCI sent by the base station on a first activated BWP among the n activated BWPs, the terminal determines a second activated BWP that needs to be monitored continuously from the n activated BWPs.

The second activated BWP is one of the above n activated BWPs. In an embodiment, the second activated BWP is an activated BWP in a channel idle state among above-mentioned n activated BWPs.

In a possible implementation, the terminal determines the first activated BWP as the second activated BWP that needs to be continuously monitored. That is, an activated BWP on which the terminal first monitors first DCI signaling belonging to itself will be the activated BWP on which the terminal monitors subsequently the DCI signaling sent by the base station.

In another possible implementation, the terminal determines a second activated BWP that needs to be monitored continuously according to monitoring indication information in the first DCI; where the monitoring indication information includes the identifier of the second activated BWP. The base station can determine the second activated BWP that needs to be monitored by the terminal after the first DCI is received, and carry the identifier of the second activated BWP in the first DCI and send it to the terminal, so that the terminal can determine a second activated BWP that needs to be monitored continuously.

In operation 206, the terminal monitors the DCI sent by the base station on the second activated BWP continuously, and stops monitoring the DCI sent by the base station on other activated BWPs other than the second activated BWP.

After the terminal determines the second BWP that needs to be monitored continuously, the terminal monitors the DCI sent by the base station on the second BWP continuously, and stops monitoring the DCI sent by the base station on other activated BWPs other than the second activated BWP. That is to say, the terminal only needs to monitor the DCI on multiple activated BWPs for an initial period of time, and once the terminal receives DCI from one of the activated BWPs, within the current channel occupation time period, the terminal monitors the DCI on the one of the activated BWPs until the current channel occupation time period ends. Through the above method, the situation that the terminal monitors the DCI on multiple activated BWPs for a long time which causes the terminal power consumption is avoided, which helps to save the terminal power.

In addition, the method provided in this embodiment may further include the following operations. The terminal determines an end time of the current channel occupancy time period obtained by the base station through channel detection. When the end time of the current channel occupancy time period arrives, the terminal starts again performing operations from the above operation 204. After the current channel occupancy time period ends, the terminal needs to monitor all activated BWPs configured by the base station for it again, until the next channel occupancy time starts.

That is to say, the reason why the terminal monitors the DCI on multiple activated BWPs are that the terminal does not know which activated BWP is idle. Once the terminal determines an activated BWP that is idle, it can monitor only one of the activated BWPs in the channel idle state.

In an embodiment, the terminal determines the end time of the current channel occupation time period in the following manners.

In a possible implementation, the terminal receives the second DCI sent by the base station, and the second DCI indicates a duration of the current channel occupation time period, and the terminal determines an end time of the current channel occupation time period according to a start time of the current channel occupation time period and the duration of the current channel occupation time period. A start symbol occupied by the first DCI is the start time of the current channel occupancy time period, or a start symbol of other signals received recently is the start time of the current channel occupancy time period. For example, the above other signals may be wake up signals, initial signals (such as Primary Synchronization Signals (PSSs), Secondary Synchronization Signals (SSSs), SS/PBCH blocks (SSBs), etc.) or signals similar to WiFi preamble, etc. In this manner, the base station clearly indicates to the terminal the duration of the current channel occupation time period through the second DCI, so that the terminal can calculate the end time of the current channel occupation time period based on the duration of the current channel occupation time period.

In another possible implementation, the terminal receives the second DCI sent by the base station, and the second DCI indicates an end time slot or an end symbol position within the current channel occupation time period, and the terminal determines the end time slot or the end symbol position as the end time of the current channel occupation time period. In this manner, the base station clearly indicates to the terminal the end time of the current channel occupation time period through the second DCI.

In another possible implementation, the terminal receives the second DCI sent by the base station, and the second DCI indicates uplink and downlink format information of time slots within the current channel occupation time period, and the terminal determines a time slot or a symbol corresponding to a last uplink and downlink format information as the end time of the current channel occupation time period. In this manner, the base station indicates to the terminal time a slot format within the current channel occupation time period through the second DCI, so that the terminal can determine the end time of the current channel occupation time period based on the slot format, and realize the implicit indication of the end time of the current channel occupation time period.

In any of the above-mentioned implementations, the second DCI includes at least one of the first DCI or the DCI sent by the base station on the second activated BWP. That is to say, the base station may indicate to the terminal the end time of the current channel occupation time period in the first DCI described above, or may indicate the end of the current channel occupation time period to the terminal in other DCIs sent within the current channel occupation time period. It should be noted that if the second DCI is the first DCI, the operation of receiving by the terminal the second DCI sent by the base station is an operation in which the terminal monitors the first DCI sent by the base station on the first activated BWP.

One point that needs to be supplemented is that the base station can also update the n activated BWPs configured for the terminal, for example, increase or decrease the activated BWP configured for the terminal. The base station may notify the terminal of the updated activated BWP through at least one of BWP configuration information or BWP activation information. After the terminal determines the updated activated BWP configured by the base station for it according to the at least one of BWP configuration information or BWP activation information, the terminal monitors, on the updated activated BWP, the DCI sent by the base station.

To sum up, in the technical solution provided by the embodiments of the present disclosure, by configuring multiple activated BWPs for a terminal by a base station, the base station can select an activated BWP in the channel idle state from the multiple activated BWPs to send DCI to the terminal to ensure that the base station can effectively schedule and control the terminal. In addition, the terminal first monitors DCI on multiple activated BWPs configured by the base station. After the terminal monitors first DCI sent by the base station on a first activated BWP, the terminal determines a second activated BWP that needs to be monitored continuously from the multiple activated BWPs, and monitors DCI sent by the base station on the second activated BWP continuously, and stops monitoring DCI sent by the base station on other activated BWPs other than the second activated BWP, thereby avoiding the consumption of terminal power caused by the terminal monitoring DCI on the multiple activated BWP for a long time, which helps to save the terminal power.

In the above-mentioned method embodiments, the technical solutions of the present disclosure are introduced and explained only from the perspective of interaction between the terminal and the base station. The above-mentioned operations performed by the terminal side can be separately implemented as a method for receiving DCI on the terminal side, and the above-mentioned operations performed by the base station side can be separately implemented as a method for sending DCI on the base station side.

The following are apparatus embodiments of the present disclosure, which can be used to implement the method embodiments of the present disclosure. For details that are not disclosed in the apparatus embodiments of the present disclosure, please refer to the method embodiments of the present disclosure.

Figure 3:
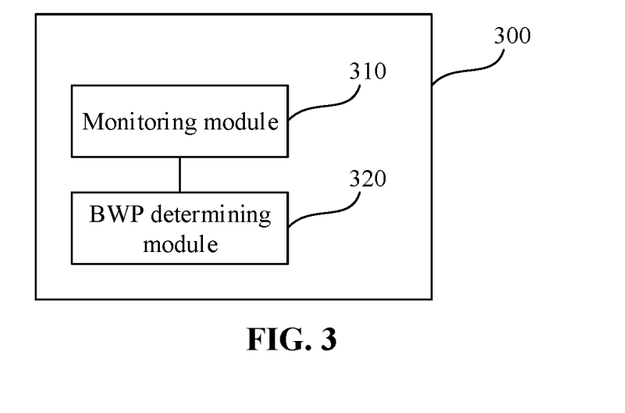
FIG. 3 is a block diagram showing an apparatus for receiving DCI according to an exemplary embodiment.

FIG. 3 is a block diagram showing an apparatus for receiving DCI according to an exemplary embodiment. The apparatus has the function of realizing the above-mentioned method example on the terminal side, and the function can be realized by hardware, or by hardware executing corresponding software. The apparatus can be the terminal described above, or it can be set in the terminal. The apparatus 300 may include a monitoring module 310 and a BWP determining module 320.

The monitoring module 310 is configured to monitor DCI sent by a base station on n activated BWPs configured by the base station, where n is an integer greater than 1.

The BWP determining module 320 is configured to: after the monitoring module monitors first DCI sent by the base station on a first activated BWP among the n activated BWPs, determine a second activated BWP that needs to be monitored continuously from the n activated BWPs.

The monitoring module 310 is further configured to monitor DCI sent by the base station on the second activated BWP continuously, and stop monitoring DCI sent by the base station on other activated BWPs other than the second activated BWP.

To sum up, in the technical solution provided by the embodiments of the present disclosure, by configuring multiple activated BWPs for a terminal by a base station, the base station can select an activated BWP in the channel idle state from the multiple activated BWPs to send DCI to the terminal to ensure that the base station can effectively schedule and control the terminal. In addition, the terminal first monitors DCI on multiple activated BWPs configured by the base station. After the terminal monitors first DCI sent by the base station on a first activated BWP, the terminal determines a second activated BWP that needs to be monitored continuously from the multiple activated BWPs, and monitors DCI sent by the base station on the second activated BWP continuously, and stops monitoring DCI sent by the base station on other activated BWPs other than the second activated BWP, thereby avoiding the consumption of terminal power caused by the terminal monitoring DCI on the multiple activated BWP for a long time, which helps to save the terminal power.

In an optional embodiment provided based on the embodiment of FIG. 3, the BWP determining module 320 is configured to determine the first activated BWP as the second activated BWP that needs to be monitored continuously.

In another optional embodiment provided based on the embodiment of FIG. 3, the BWP determining module 330 is configured to: according to monitoring indication information in the first DCI, determine the second activated BWP that needs to be monitored continuously, where the monitoring indication information includes an identifier of the second activated BWP.

In another optional embodiment provided based on the embodiment of FIG. 3 or any of the above-mentioned optional embodiments, the apparatus 300 further includes a time determining module.

The time determining module is configured to determine an end time of current channel occupation time period obtained by the base station through channel detection, where the current channel occupation time period is channel occupation time period to which the first DCI belongs.

The monitoring module 310 is further configured to: when the end time of the current channel occupancy time arrives, start performing an operation of monitoring the DCI sent by the base station on the n activated BWPs configured by the base station again.

In an embodiment, the time determining module includes one of a first determining sub-module, a second determining sub-module or a third determining sub-module.

The first determining sub-module is configured to receive second DCI which is sent by the base station and indicates a duration of the current channel occupation time period, and determine the end time of the current channel occupation time period according to a start time of the current channel occupation time period and the duration of the current channel occupation time period, where the start symbol occupied by the first DCI is the start time of the current channel occupation time period, or a start symbol of the other signals received recently is the start time of the current channel occupation time period. For example, the other signals mentioned above can be wake up signals, initial signals, such as PSSs, SSSs, SSBs, etc., or signals similar to WiFi preamble, etc.

The second determining sub-module is configured to receive second DCI which is sent by the base station and indicates an end time slot or an end symbol position within the current channel occupation time period, and determine the end time slot or the end symbol position as the end time of the current channel occupation time period.

The third determining sub-module is configured to receive second DCI which is sent by the base station and indicates uplink-downlink format information of time slots within the current channel occupation time period, and determine a time slot or a symbol corresponding to last uplink-downlink format information as the end time of the current channel occupation time period.

The second DCI includes at least one of the first DCI or the DCI sent by the base station on the second activated BWP.

In another optional embodiment provided based on the embodiment of FIG. 3 or any of the above-mentioned optional embodiments, the apparatus 300 further includes a receiving module.

The receiving module is configured to receive at least one of BWP configuration information or BWP activation information from the base station, where the at least one of BWP configuration information or BWP activation information is used to instruct the terminal to monitor the DCI sent by the base station on the n activated BWPs.

Figure 4:
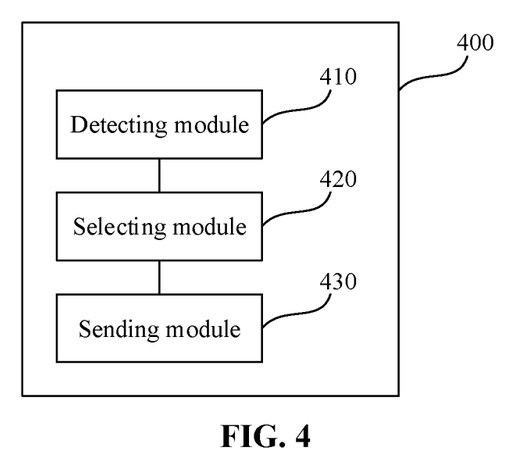
FIG. 4 is a block diagram showing an apparatus for sending DCI according to an exemplary embodiment.

FIG. 4 is a block diagram showing an apparatus for sending DCI according to an exemplary embodiment. The apparatus has the function of realizing the above-mentioned method example on the base station side, and the function can be realized by hardware, or by hardware executing corresponding software. The apparatus can be the base station described above, or the apparatus can be set in the base station. The apparatus 400 may include: a detecting module 410, a selecting module 420, and a sending module 430.

The detecting module 410 is configured to detect one or more activated BWPs in a channel idle state among n activated BWPs configured for a terminal, where n is an integer greater than 1.

The selecting module 420 is configured to select a first activated BWP from the one or more activated BWPs in the channel idle state.

The sending module 430 is configured to send first DCI to the terminal through the first activated BWP.

To sum up, in the technical solution provided by the embodiments of the present disclosure, by configuring multiple activated BWPs for the terminal by the base station, the base station can select an activated BWP in the channel idle state from the multiple activated BWPs to send DCI to the terminal to ensure that the base station can effectively schedule and control the terminal. In addition, the terminal first monitors DCI on multiple activated BWPs configured by the base station. After the terminal monitors first DCI sent by the base station on a first activated BWP, the terminal determines a second activated BWP that needs to be monitored continuously from the multiple activated BWPs, and monitors DCI sent by the base station on the second activated BWP continuously, and stops monitoring DCI sent by the base station on other activated BWPs other than the second activated BWP, thereby avoiding the consumption of terminal power caused by the terminal monitoring DCI on the multiple activated BWP for a long time, which helps to save the terminal power.

In an optional embodiment provided based on the embodiment of FIG. 4, the first DCI carries monitoring indication information, where the monitoring indication information includes an identifier of a second activated BWP that needs to be monitored continuously by the terminal after the first DCI is received.

In an embodiment, the base station sends DCI to the terminal only through the second activated BWP before current channel occupation time period ends, where the current channel occupation time period is a channel occupation time period to which the first DCI belongs.

In an embodiment, second DCI sent by the base station to the terminal indicates a duration of the current channel occupation time period, where the duration of the current channel occupation time period is used by the terminal to determine an end time of the current channel occupation time period according to a start time of the current channel occupation time period and the duration of the current channel occupation time period. A start symbol occupied by the first DCI is the start time of the current channel occupancy time period, or a start symbol of other signals received recently is the start time of the current channel occupancy time period. For example, the above other signals may be wake up signals, initial signals, (such as PSSs, SSSs, SSBs, etc.) or signals similar to WiFi preamble, etc.

Alternatively, second DCI sent by the base station to the terminal indicates an end time slot or an end symbol position within the current channel occupation time period, where the end time slot or the end symbol position within the current channel occupation time period is determined by the terminal as an end time of the current channel occupation time period.

Alternatively, second DCI sent by the base station to the terminal indicates uplink-downlink format information of time slots within the current channel occupation time period, where a time slot or a symbol corresponding to last uplink-downlink format information is determined by the terminal as an end time of the current channel occupation time period.

The second DCI includes at least one of the first DCI or the DCI sent by the base station on the second activated BWP.

In an optional embodiment provided based on the embodiment of FIG. 4 or any of the above-mentioned optional embodiments, the sending module 430 is further configured to send at least one of BWP configuration information or BWP activation information to the terminal, where the at least one of BWP configuration information or BWP activation information is used to instruct the terminal to monitor the DCI sent by the base station on the n activated BWPs.

It should be noted that, when the apparatus provided by the above embodiment realizes its functions, only the division of the above functional modules is used as an example. In actual applications, the above functions can be allocated by different functional modules according to actual needs. That is, the content structure of the device is divided into different functional modules to complete all or part of the functions described above.

Regarding the apparatus in the above-mentioned embodiment, the specific manner in which each module performs operations has been described in detail in the embodiment of the method, and detailed description will not be given here.

An exemplary embodiment of the present disclosure further provides a terminal, the terminal including: a processor; and a memory for storing executable instructions of the processor, where the processor is configured to perform the following operations:

monitoring DCI sent by a base station on n activated BWPs configured by the base station, where n is an integer greater than 1;

determining a second activated BWP that needs to be monitored continuously from the n activated BWPs, after the terminal monitors first DCI sent by the base station on a first activated BWP among the n activated BWPs; and monitoring DCI sent by the base station on the second activated BWP continuously, and stopping monitoring DCI sent by the base station on other activated BWPs other than the second activated BWP.

In an embodiment, the processor is configured to determine the first activated BWP as the second activated BWP that needs to be continuously monitored.

In an embodiment, the processor is configured to: according to monitoring indication information in the first DCI, determine the second activated BWP that needs to be monitored continuously, where the monitoring indication information includes an identifier of the second activated BWP.

In an embodiment, the processor is further configured to perform the following operations:
  determining an end time of a current channel occupation time period obtained by the base station through channel detection, where the current channel occupation time period is a channel occupation time period to which the first DCI belongs:
  starting performing an operation of monitoring the DCI sent by the base station on the n activated BWPs configured by the base station again when the end time of the current channel occupancy time arrives.

In an embodiment, the processor is configured to perform one of the following operations:
  receiving second DCI sent by the base station, where the second DCI indicates a duration of the current channel occupation time period, and determining the end time of the current channel occupation time period according to a start time of the current channel occupation time period and the duration of the current channel occupation time period. A start symbol occupied by the first DCI is the start time of the current channel occupancy time period, or a start symbol of other signals received recently is the start time of the current channel occupancy time period. For example, the above other signals may be wake up signals, initial signals (such as PSSs, SSSs, SSBs, etc.) or signals similar to WiFi preamble, etc;
  receiving second DCI sent by the base station, where the second DCI indicates an end time slot or an end symbol position within the current channel occupation time period, and determining the end time slot or the end symbol position as the end time of the current channel occupation time period; or
  receiving second DCI sent by the base station, where the second DCI indicates uplink-downlink format information of time slots within the current channel occupation time period, and determining, by the terminal, a time slot or a symbol corresponding to last uplink-downlink format information as the end time of the current channel occupation time period.

The second DCI includes at least one of the first DCI or the DCI sent by the base station on the second activated BWP.

In an embodiment, the processor is further configured to: receive at least one of BWP configuration information or BWP activation information from the base station, where the at least one of BWP configuration information or BWP activation information is used to instruct the terminal to monitor the DCI sent by the base station on the n activated BWPs.

An exemplary embodiment of the present disclosure further provides a base station, the base station including: a processor; and a memory for storing executable instructions of the processor, where the processor is configured to perform the following operations:
  detecting one or more activated BWPs in a channel idle state among n activated BWPs configured for a terminal, where n is an integer greater than 1;
  selecting a first activated BWP from the one or more activated BWPs in the channel idle state; and
  sending first DCI to the terminal through the first activated BWP.

In an embodiment, the first DCI carries monitoring indication information, where the monitoring indication information includes an identifier of a second activated BWP that the terminal needs to be monitored continuously after the first DCI is received.

In an embodiment, the base station sends DCI to the terminal only through the second activated BWP before a current channel occupation time period ends, where the current channel occupation time period is a channel occupation time period to which the first DCI belongs.

In an embodiment, second DCI sent by the base station to the terminal indicates a duration of the current channel occupation time period, where the duration of the current channel occupation time period is used by the terminal to determine an end time of the current channel occupation time period according to a start time of the current channel occupation time period and the duration of the current channel occupation time period. A start symbol occupied by the first DCI is the start time of the current channel occupancy time period, or a start symbol of other signals received recently is the start time of the current channel occupancy time period. For example, the above other signals may be wake up signals, initial signals (such as PSSs, SSSs, SSBs, etc.) or signals similar to WiFi preamble, etc.

Alternatively, second DCI sent by the base station to the terminal indicates an end time slot or an end symbol position within the current channel occupation time period, where the end time slot or the end symbol position within the current channel occupation time period is determined by the terminal as an end time of the current channel occupation time period.

Alternatively, second DCI sent by the base station to the terminal indicates uplink-downlink format information of time slots within the current channel occupation time period, where a time slot or a symbol corresponding to last uplink-downlink format information is determined by the terminal as an end time of the current channel occupation time period.

The second DCI includes at least one of the first DCI or the DCI sent by the base station on the second activated BWP.

In an embodiment, the processor is further configured to send at least one of BWP configuration information or BWP activation information to the terminal, where the at least one of BWP configuration information or BWP activation information is used to instruct the terminal to monitor the DCI sent by the base station on the n activated BWPs.

The above content mainly introduces the solutions provided by the embodiments of the present disclosure from the perspective of the interaction between the base station and the terminal. It can be understood that, in order to realize the above-mentioned functions, the base station and the terminal include hardware structures and/or software modules corresponding to each function. In combination with the units and algorithm operations of the examples described in the embodiments disclosed in the present disclosure, the embodiments of the present disclosure can be implemented in the form of hardware or a combination of hardware and computer software. Whether a function is executed by hardware or computer software-driven hardware depends on the specific application and design constraints of the technical solution. Those skilled in the art may use different methods for each specific application to implement the described functions, but such implementation should not be considered as going beyond the scope of the technical solutions of the embodiments of the present disclosure.

Figure 5:
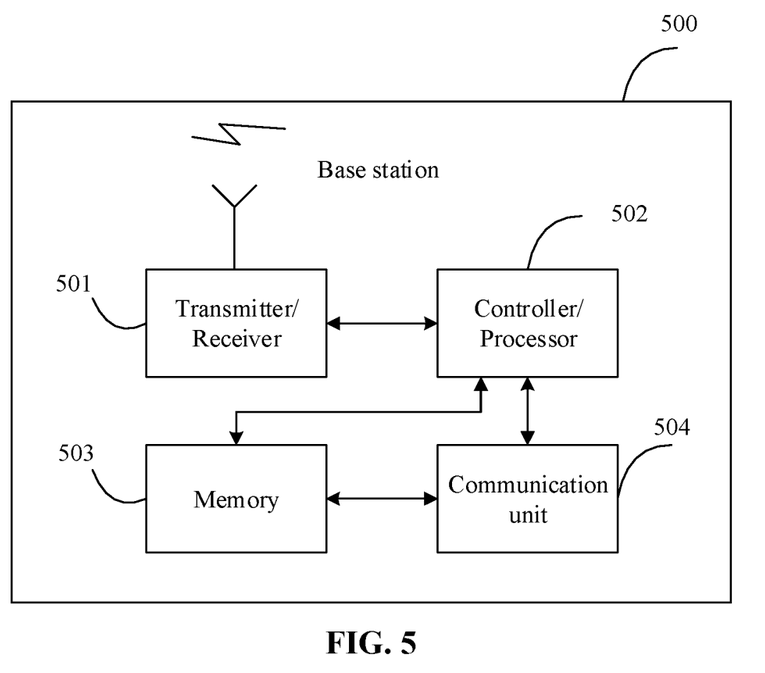
FIG. 5 is a schematic structural diagram showing a base station according to an exemplary embodiment.

FIG. 5 is a schematic structural diagram showing a base station according to an exemplary embodiment.

The base station 500 includes a transmitter/receiver 501 and a processor 502. The processor 502 may also be a controller, which is represented as "controller/processor 502" in FIG. 5. The transmitter/receiver 501 is used to support the sending and receiving of information between the base station and the terminal in the above-mentioned embodiment, and to support communication between the base station and other network entities. The processor 502 performs various functions for communicating with the terminal. On the uplink, the uplink signal from the terminal is received via an antenna, demodulated by the receiver 501 (for example, a high-frequency signal is demodulated into a baseband signal), and further processed by the processor 502 to restore service data and signaling messages sent by the terminal. On the downlink, service data and signaling messages are processed by the processor 502, and modulated by the transmitter 501 (for example, the baseband signal is modulated into a high-frequency signal) to generate a downlink signal, which is transmitted to the terminal via an antenna. It should be noted that the above-mentioned demodulation or modulation function may also be completed by the processor 502. For example, the processor 502 is further configured to execute various operations on the base station side in the above-mentioned method embodiments, and/or other operations of the technical solutions described in the embodiments of the present disclosure.

Further, the base station 500 may further include a memory 503, and the memory 503 is used to store program codes and data of the base station 500. In addition, the base station 500 may further include a communication unit 504. The communication unit 504 is configured to support the base station 500 to communicate with other network entities (for example, network devices in the core network, etc.). For example, in a 5G NR system, the communication unit 504 may be an NG-U interface for supporting the base station 500 to communicate with a User Plane Function (UPF) entity; or, the communication unit 504 may also be an NG-C interface for supporting the base station 500 to communicate with an Access and Mobility Management Function (AMF) entity.

It can be understood that FIG. 5 only shows a simplified design of the base station 500. In practical applications, the base station 500 may include any number of transmitters, receivers, processors, controllers, memories, communication units, etc., and all base stations that can implement the embodiments of the present disclosure are within the protection scope of the embodiments of the present disclosure.

Figure 6:
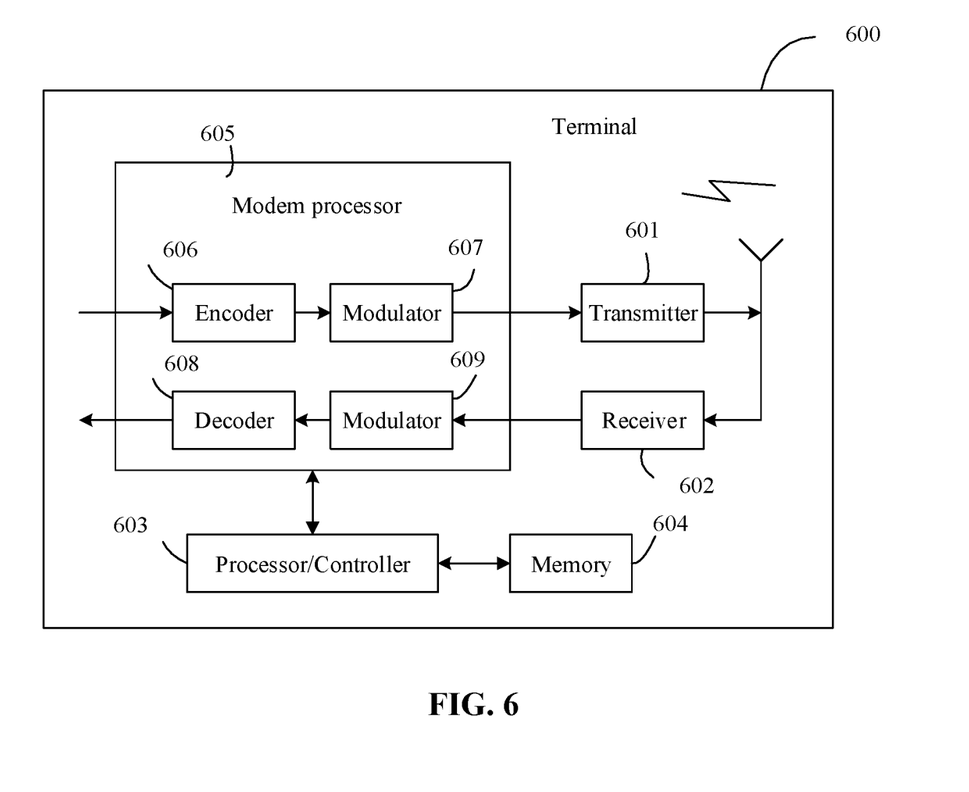
FIG. 6 is a schematic structural diagram showing a terminal according to an exemplary embodiment.

FIG. 6 is a schematic structural diagram of a terminal according to an exemplary embodiment.

The terminal 600 includes a transmitter 601, a receiver 602, and a processor 603. The processor 603 may also be a controller, which is represented as "controller/processor 603" in FIG. 6. In an embodiment, the terminal 600 may further include a modem processor 605, where the modem processor 605 may include an encoder 606, a modulator 607, a decoder 608, and a demodulator 609.

In one example, the transmitter 601 adjusts (for example, through analog conversion, filtering, amplification, or up-conversion, etc.) the output samples and generates an uplink signal, which is transmitted to the base station described in the above embodiment via an antenna. On the downlink, the antenna receives the downlink signal transmitted by the base station in the above embodiment. The receiver 602 adjusts (eg, through filtering, amplification, down-conversion, and digitizations, etc.) the signal received from the antenna and provides input samples. In the modem processor 605, the encoder 606 receives service data and signaling messages to be transmitted on the uplink, and processes the service data and signaling messages (for example, through formatting, encoding, and interleaving). The modulator 607 further processes (for example, through symbol mapping and modulation) the encoded service data and signaling messages and provides output samples. The demodulator 609 processes (e.g., through demodulation) the input samples and provides symbol estimations. The decoder 608 processes (e.g., through deinterleaving and decoding) the symbol estimations and provides decoded data and signaling messages sent to the terminal 600. The encoder 606, the modulator 607, the demodulator 609, and the decoder 608 can be implemented by a synthesized modem processor 605. These units are processed according to the wireless access technology adopted by the wireless access network (for example, the access technology of LTE and other evolved systems). It should be noted that when the terminal 600 does not include the modem processor 605, the above-mentioned functions of the modem processor 605 may also be performed by the processor 603.

The processor 603 controls and manages the actions of the terminal 600, and is configured to execute the processing procedure performed by the terminal 600 in the above-mentioned embodiment of the present disclosure. For example, the processor 603 is further configured to execute each operation on the terminal side in the above-mentioned method embodiment, and/or other operations of the technical solution described in the embodiment of the present disclosure.

Further, the terminal 600 may further include a memory 604, and the memory 604 is configured to store program codes and data for the terminal 600.

It can be understood that FIG. 6 only shows a simplified design of the terminal 600. In practical applications, the terminal 600 may include any number of transmitters, receivers, processors, modem processors, memories, etc., and all terminals that can implement the embodiments of the present disclosure are within the protection scope of the embodiments of the present disclosure.

The embodiment of the present disclosure also provides a non-transitory computer-readable storage medium having stored thereon computer programs, where the computer programs implement the method for sending DCI on the base station side as described above when being executed by the processor of the base station.

The embodiment of the present disclosure also provides a non-transitory computer-readable storage medium having stored thereon computer programs, where the computer programs implement the method for receiving DCI on the terminal side as described above when being executed by the processor of the terminal.

It should be understood that the "multiple" mentioned herein refers to two or more. The term "and/or" herein describes an association relationship of associated objects, which means that there may be three relationships, for example "A and/or B" may have three meanings: A exists alone, A and B exist at the same time and B exists alone. In addition, the character "/" herein generally indicates that the associated objects before and after the character "/" are in an "or" relationship.

After considering the specification and practicing the disclosure disclosed herein, those skilled in the art will easily think of other embodiments of the present disclosure. This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only to be regarded as exemplary, and the true scope and spirit of the present disclosure are pointed out by the following claims.

It should be understood that the present disclosure is not limited to the precise structure described above and shown in the drawings, and various modifications and changes can be made without departing from its scope. The scope of the present disclosure is only limited by the appended claims.

What is claimed is:

1. A method for receiving downlink control information (DCI), comprising:
   monitoring, by a terminal, DCI sent by a base station on n activated Bandwidth Parts (BWPs) configured by the base station, where n is an integer greater than 2;
   after the terminal monitors first DCI sent by the base station on a first activated BWP among the n activated BWPs, determining, by the terminal according to the first DCI, from the n activated BWPs, a second activated BWP that needs to be monitored continuously, wherein the first DCI carries monitoring indication information comprising an identifier of the second activated BWP; and
   monitoring, by the terminal, DCI sent by the base station on the second activated BWP continuously, and stopping monitoring DCI sent by the base station on other activated BWPs other than the second activated BWP.

2. The method of claim 1, wherein determining, by the terminal according to the first DCI, from the n activated BWPs, the second activated BWP that needs to be monitored subsequently further comprises:
   determining, by the terminal, the first activated BWP as the second activated BWP that needs to be monitored continuously.

3. The method of claim 1, further comprising:
   determining, by the terminal, an end time of a current channel occupation time period obtained by the base station through channel detection, wherein the current channel occupation time period is a channel occupation time period to which the first DCI belongs; and
   when the end time of the current channel occupancy time arrives, starting, by the terminal, performing an operation of monitoring the DCI sent by the base station on the n activated BWPs configured by the base station again.

4. The method of claim 3, wherein determining, by the terminal, the end time of the current channel occupation time period obtained by the base station through the channel detection comprises:
   receiving, by the terminal, second DCI sent by the base station, wherein the second DCI indicates a duration of the current channel occupation time period, and determining, by the terminal, the end time of the current channel occupation time period according to a start time of the current channel occupation time period and the duration of the current channel occupation time period; or
   receiving, by the terminal, second DCI sent by the base station, wherein the second DCI indicates an end time slot or an end symbol position within the current channel occupation time period, and determining, by the terminal, the end time slot or the end symbol position as the end time of the current channel occupation time period; or
   receiving, by the terminal, second DCI sent by the base station, wherein the second DCI indicates uplink-downlink format information of time slots within the current channel occupation time period, and determining, by the terminal, a time slot or a symbol corresponding to last uplink-downlink format information as the end time of the current channel occupation time period;
   wherein the second DCI comprises at least one of the first DCI or the DCI sent by the base station on the second activated BWP.

5. The method of claim 1, further comprising:
   receiving, by the terminal, at least one of BWP configuration information or BWP activation information from the base station, wherein the at least one of BWP configuration information or BWP activation information is used to instruct the terminal to monitor the DCI sent by the base station on the n activated BWPs.

6. A method for sending downlink control information (DCI), comprising:
   detecting, by a base station, one or more activated Bandwidth Parts (BWPs) in a channel idle state among n activated BWPs configured for a terminal, where n is an integer greater than 2;
   selecting, by the base station, a first activated BWP from the one or more activated BWPs in the channel idle state;
   sending, by the base station, first DCI to the terminal through the first activated BWP, wherein the first DCI carries monitoring indication information comprising an identifier of a second activated BWP that needs to be monitored continuously by the terminal after the first DCI is received; and
   causing the terminal to stop monitoring DCI sent by the base station on other activated BWPs other than the second activated BWP.

7. The method of claim 6, wherein the base station sends DCI to the terminal only through the second activated BWP before a current channel occupation time period ends, wherein the current channel occupation time period is a channel occupation time period to which the first DCI belongs.

8. The method of claim 7, wherein
   second DCI sent by the base station to the terminal indicates a duration of the current channel occupation time period, wherein the duration of the current channel occupation time period is used by the terminal to determine an end time of the current channel occupation time period according to a start time of the current channel occupation time period and the duration of the current channel occupation time period; or
   second DCI sent by the base station to the terminal indicates an end time slot or an end symbol position within the current channel occupation time period, wherein the end time slot or the end symbol position within the current channel occupation time period is determined by the terminal as the end time of the current channel occupation time period; or second DCI sent by the base station to the terminal indicates uplink-downlink format information of time slots within the current channel occupation time period, wherein a time slot or a symbol corresponding to last uplink-downlink format information is determined by the terminal as an end time of the current channel occupation time period;

wherein the second DCI comprises at least one of the first DCI or the DCI sent by the base station on the second activated BWP.

9. The method of claim 6, further comprising:

sending, by the base station, at least one of BWP configuration information or BWP activation information to the terminal, wherein the at least one of BWP configuration information or BWP activation information is used to instruct the terminal to monitor the DCI sent by the base station on the n activated BWPs.

10. A terminal, comprising:

a processor;

a receiver; and a memory, configured to store executable instructions of the processor;

wherein the processor is configured to:

monitor DCI sent by a base station on n activated Bandwidth Parts (BWPs) configured by the base station via the receiver, where n is an integer greater than 2;

after monitoring first DCI sent by the base station on a first activated BWP among the n activated BWPs, determine, according to the first DCI, from the n activated BWPs, a second activated BWP that needs to be monitored continuously, wherein the first DCI carries monitoring indication information comprising an identifier of the second activated BWP; and monitor DCI sent by the base station on the second activated BWP continuously via the receiver, and stop monitoring DCI sent by the base station on other activated BWPs other than the second activated BWP.

11. The terminal of claim 10, wherein the processor is further configured to determine the first activated BWP as the second activated BWP that needs to be monitored continuously.

12. The terminal of claim 10, wherein the processor is further configured to determine an end time of current channel occupation time period obtained by the base station through channel detection, wherein the current channel occupation time period is channel occupation time period to which the first DCI belongs;

and wherein the processor is further configured to: when the end time of the current channel occupancy time arrives, start performing an operation of monitoring the DCI sent by the base station on the n activated BWPs configured by the base station again.

13. The terminal of claim 12, wherein the processor is further configured to:

receive second DCI which is sent by the base station and indicates a duration of the current channel occupation time period via the receiver, and determine the end time of the current channel occupation time period according to a start time of the current channel occupation time period and the duration of the current channel occupation time period; or receive second DCI which is sent by the base station and indicates an end time slot or an end symbol position within the current channel occupation time period via the receiver, and determine the end time slot or the end symbol position as the end time of the current channel occupation time period; or receive second DCI which is sent by the base station and indicates uplink-downlink format information of time slots within the current channel occupation time period via the receiver, and determine a time slot or a symbol corresponding to last uplink-downlink format information as the end time of the current channel occupation time period, wherein the second DCI comprises at least one of the first DCI or the DCI sent by the base station on the second activated BWP.

14. The terminal of claim 10, wherein the processor is further configured to:

receive at least one of BWP configuration information or BWP activation information from the base station via the receiver, wherein the at least one of BWP configuration information or BWP activation information is used to instruct the terminal to monitor the DCI sent by the base station on the n activated BWPs.

15. A base station, comprising:

a processor;

a transmitter; and a memory, configured to store executable instructions of the processor, wherein the processor is configured to:

detect one or more activated Bandwidth Parts (BWPs) in a channel idle state among n activated BWPs configured for a terminal, where n is an integer greater than 2;

select a first activated BWP from the one or more activated BWPs in the channel idle state;

send first DCI to the terminal through the first activated BWP via the transmitter, wherein the first DCI carries monitoring indication information comprising an identifier of a second activated BWP that needs to be monitored continuously by the terminal after the first DCI is received; and cause the terminal to stop monitoring DCI sent by the base station on other activated BWPs other than the second activated BWP.

16. The base station of claim 15, wherein the base station sends DCI to the terminal only through the second activated BWP before current channel occupation time period ends, wherein the current channel occupation time period is a channel occupation time period to which the first DCI belongs.

17. The base station of claim 16, wherein second DCI sent by the base station to the terminal indicates a duration of the current channel occupation time period, wherein the duration of the current channel occupation time period is used by the terminal to determine an end time of the current channel occupation time period according to a start time of the current channel occupation time period and the duration of the current channel occupation time period; or second DCI sent by the base station to the terminal indicates an end time slot or an end symbol position within the current channel occupation time period, wherein the end time slot or the end symbol position within the current channel occupation time period is determined by the terminal as an end time of the current channel occupation time period; or second DCI sent by the base station to the terminal indicates uplink-downlink format information of time slots within the current channel occupation time period, wherein a time slot or a symbol corresponding to last uplink-downlink format information is determined by the terminal as an end time of the current channel occupation time period;

wherein the second DCI comprises at least one of the first DCI or the DCI sent by the base station on the second activated BWP.

18. The base station of claim 15, wherein the processor is further configured to send at least one of BWP configuration information or BWP activation information to the terminal via the transmitter, wherein the at least one of BWP configuration information or BWP activation information is used to instruct the terminal to monitor the DCI sent by the base station on the n activated BWPs.

\* \* \* \* \*